(12) United States Patent
Kawakami

(10) Patent No.: US 7,281,489 B2
(45) Date of Patent: Oct. 16, 2007

(54) BICYCLE TRANSMISSION GEAR INDICATING DEVICE

(75) Inventor: Tatsuya Kawakami, Sakai (JP)

(73) Assignee: Shimano, Inc., Sakai, Osaka (JP)

( * ) Notice: Subject to any disclaimer, the term of this patent is extended or adjusted under 35 U.S.C. 154(b) by 449 days.

(21) Appl. No.: 10/835,847

(22) Filed: Apr. 29, 2004

(65) Prior Publication Data

US 2005/0241429 A1 Nov. 3, 2005

(51) Int. Cl.
*F16H 63/42* (2006.01)

(52) U.S. Cl. .................. 116/28.1; 74/502.2; 74/473.13

(58) Field of Classification Search ............... 74/502.2, 74/501.6, 500.5, 473.15, 473.13; 116/28.1
See application file for complete search history.

(56) References Cited

U.S. PATENT DOCUMENTS

| | | | |
|---|---|---|---|
| 3,234,814 A | 2/1966 | Buckeridge et al. | |
| 3,524,979 A | 8/1970 | Cohen | |
| 3,633,437 A | 1/1972 | Ishida | |
| 3,839,724 A | 10/1974 | Muryoi | |
| 3,901,097 A | 8/1975 | Williams et al. | |
| 4,048,949 A | 9/1977 | Schmidt | |
| 5,178,033 A | 1/1993 | Kund | |
| 5,325,735 A | 7/1994 | Nagano | |
| 5,673,594 A * | 10/1997 | Huang et al. | 74/473.13 |
| 5,676,022 A | 10/1997 | Ose | |
| 5,701,786 A * | 12/1997 | Kawakami | 74/502.2 |
| 5,730,030 A * | 3/1998 | Masui | 74/473.13 |
| 5,732,598 A | 3/1998 | Shoge et al. | |
| 5,921,139 A | 7/1999 | Yamane | |
| 6,155,132 A * | 12/2000 | Yamane | 74/502.2 |
| 6,220,111 B1 * | 4/2001 | Chen | 74/473.15 |
| 6,282,750 B1 | 9/2001 | Bishop et al. | |
| 6,450,060 B1 * | 9/2002 | Shahana | 74/502.2 |
| 6,595,894 B2 | 7/2003 | Hanatani | |
| 6,681,652 B2 | 1/2004 | Auer et al. | |
| 6,792,825 B2 * | 9/2004 | Kawakami | 74/502.2 |
| 6,810,764 B2 * | 11/2004 | Chen | 74/502.2 |
| 2001/0042421 A1 * | 11/2001 | Feng et al. | 74/502.2 |
| 2002/0139637 A1 * | 10/2002 | Tsumiyama et al. | 192/217 |

FOREIGN PATENT DOCUMENTS

| | | |
|---|---|---|
| DE | 3215427 A1 | 10/1983 |
| EP | 669249 A1 | 8/1995 |
| EP | 552775 B1 | 3/1999 |
| JP | 55-55274 | 4/1980 |
| JP | 60-13884 | 1/1985 |
| JP | 11-255172 | 9/1999 |

* cited by examiner

*Primary Examiner*—Richard Smith
*Assistant Examiner*—Tania C Courson
(74) *Attorney, Agent, or Firm*—James A. Deland

(57) ABSTRACT

A bicycle transmission gear indicating device comprises a first indicator drive member adapted to move in response to movement of a first transmission control element; a second indicator drive member adapted to move in response to movement of a second transmission control element; and an indicating unit that indicates a bicycle transmission gear. A motion communicating unit is operatively coupled to the first indicator drive member and to the second indicator drive member and is adapted to communicate motion of the first indicator drive member and the second indicator drive member to the indicating unit.

24 Claims, 16 Drawing Sheets

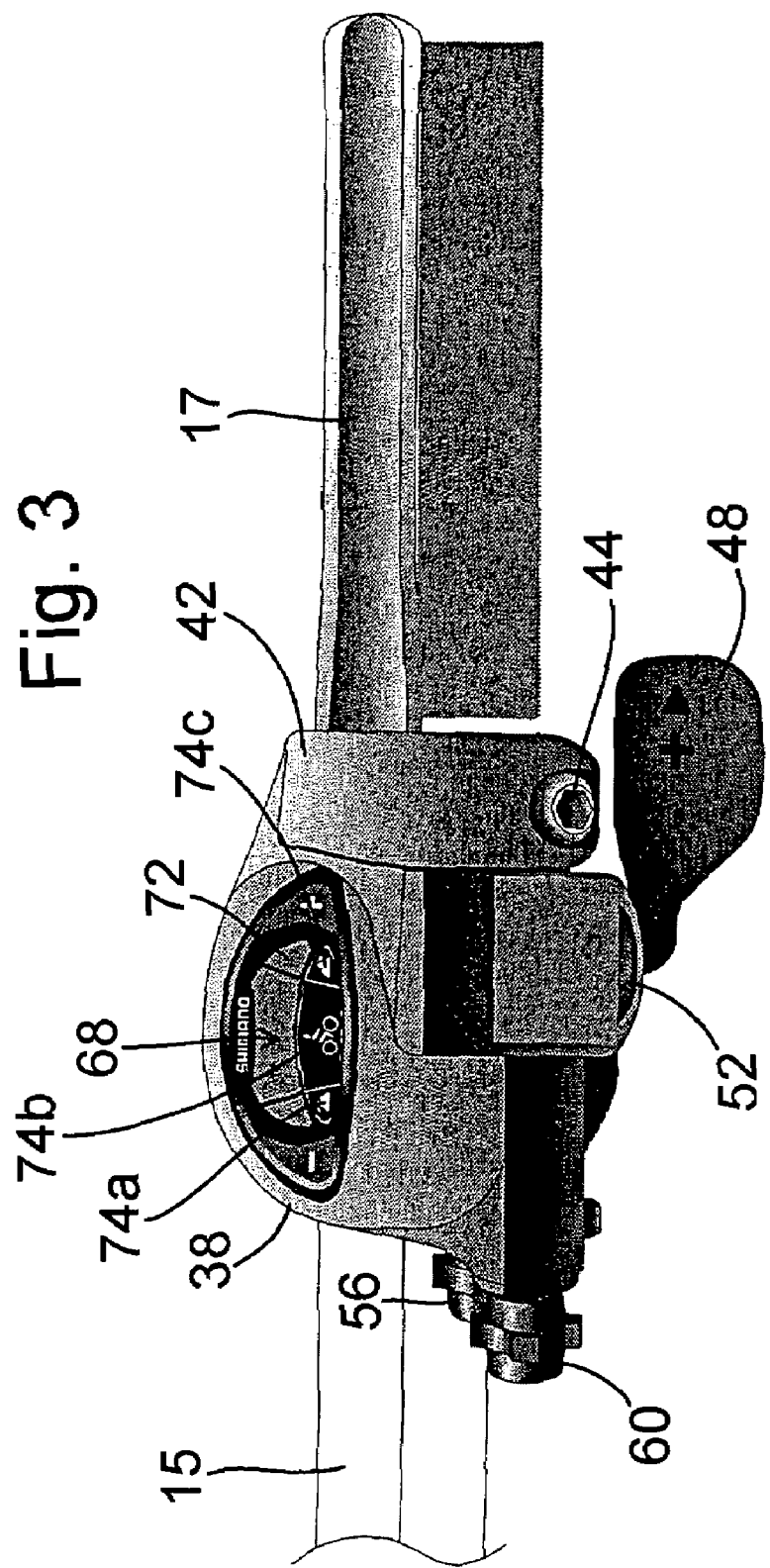

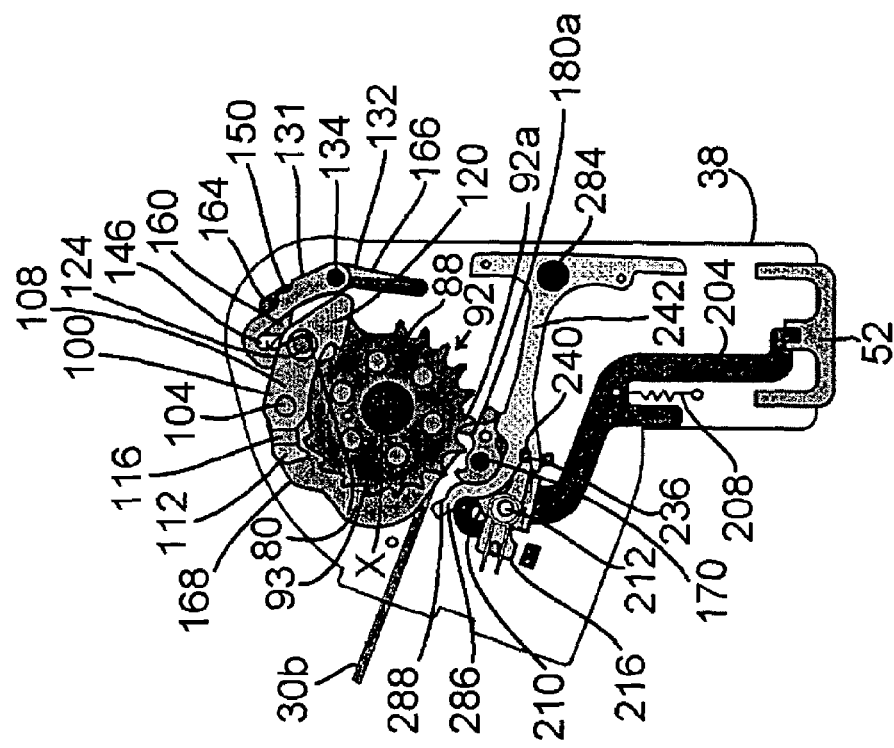

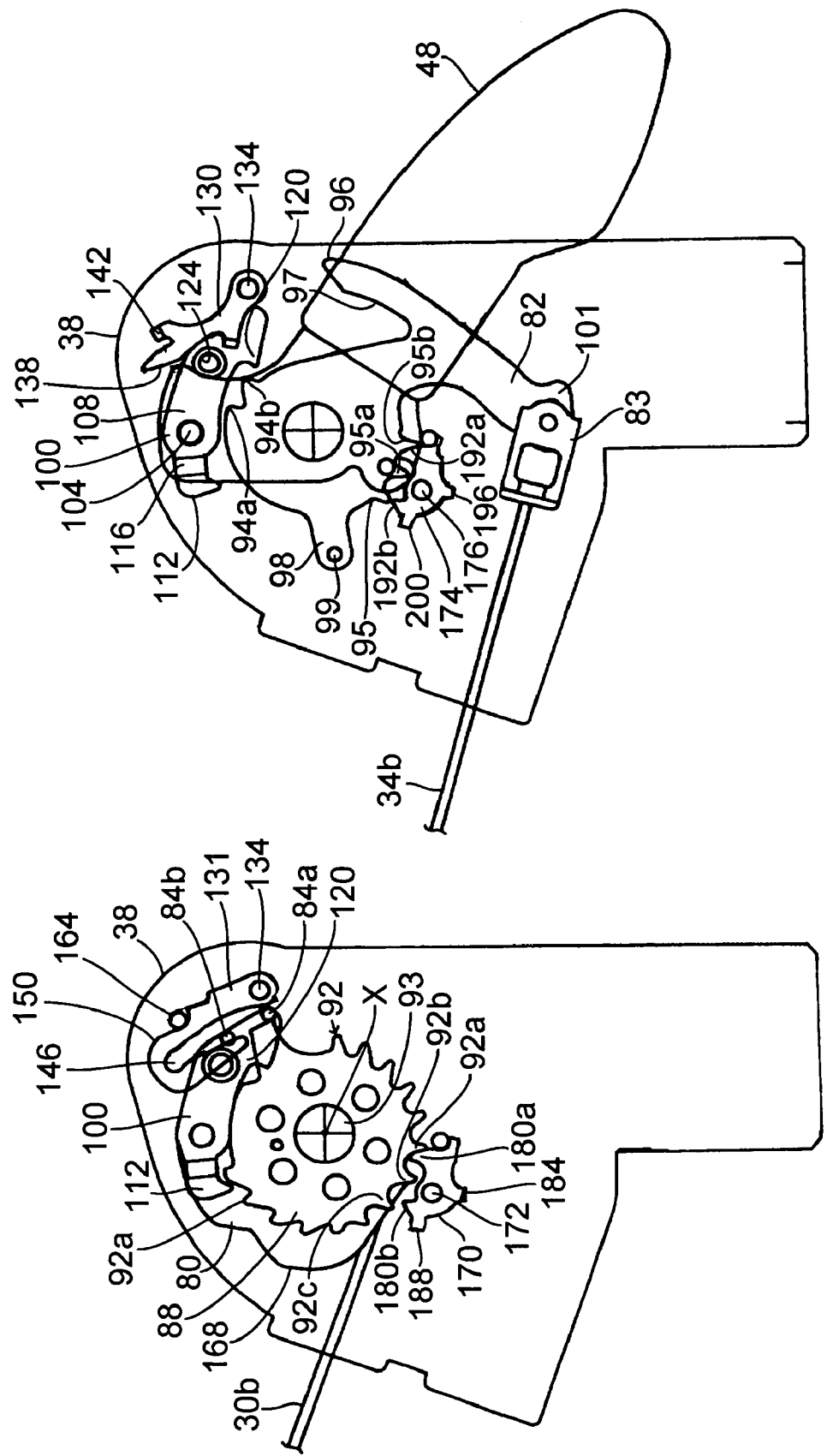

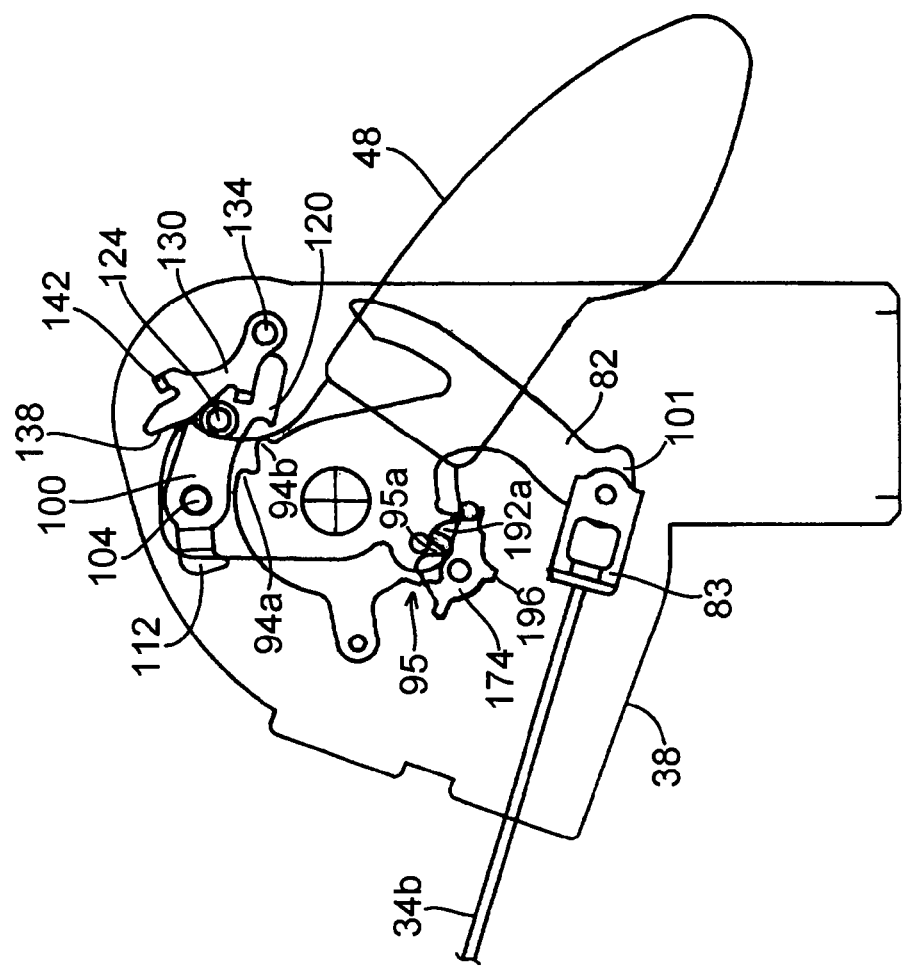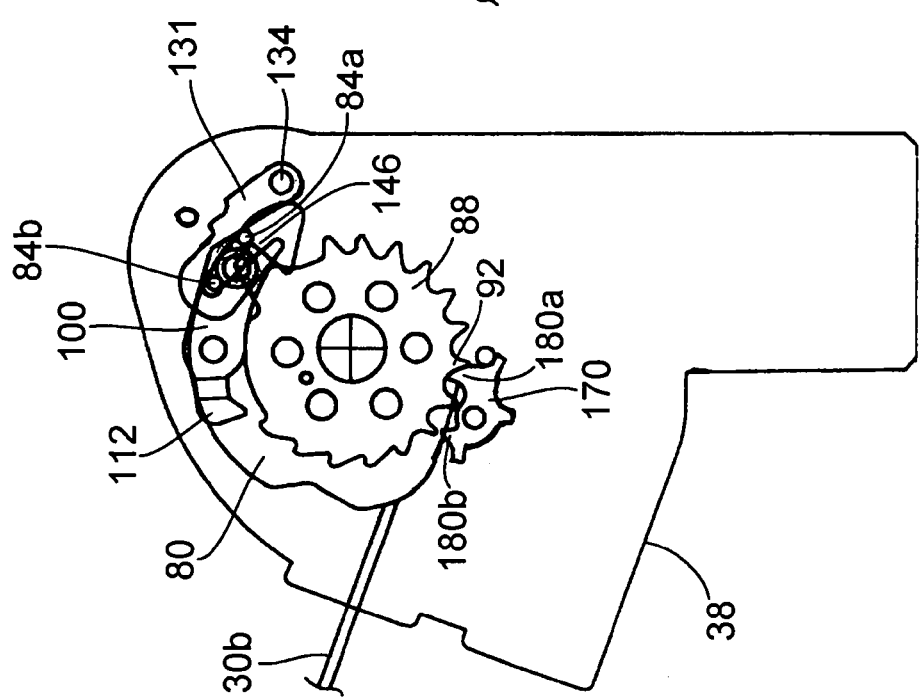

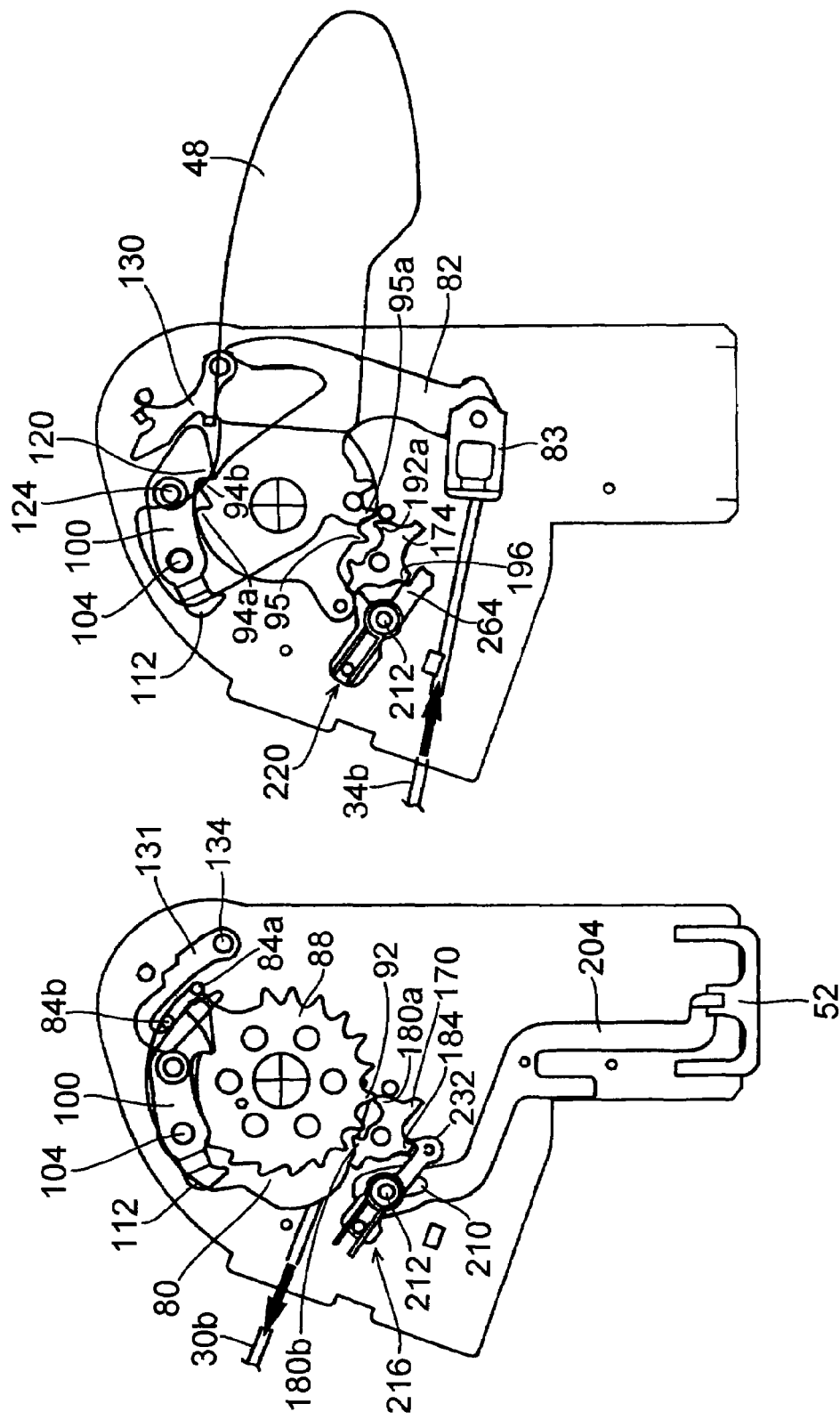

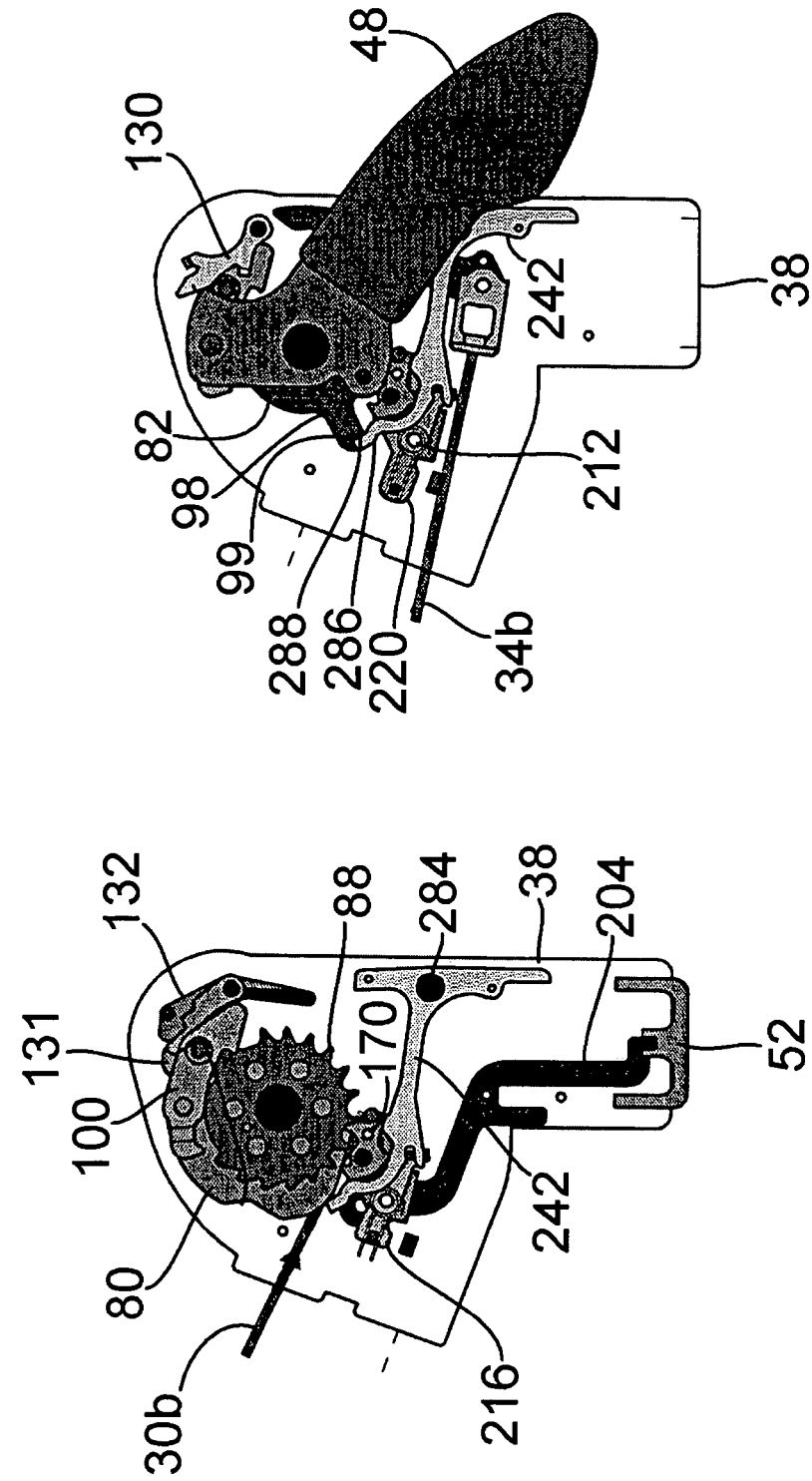

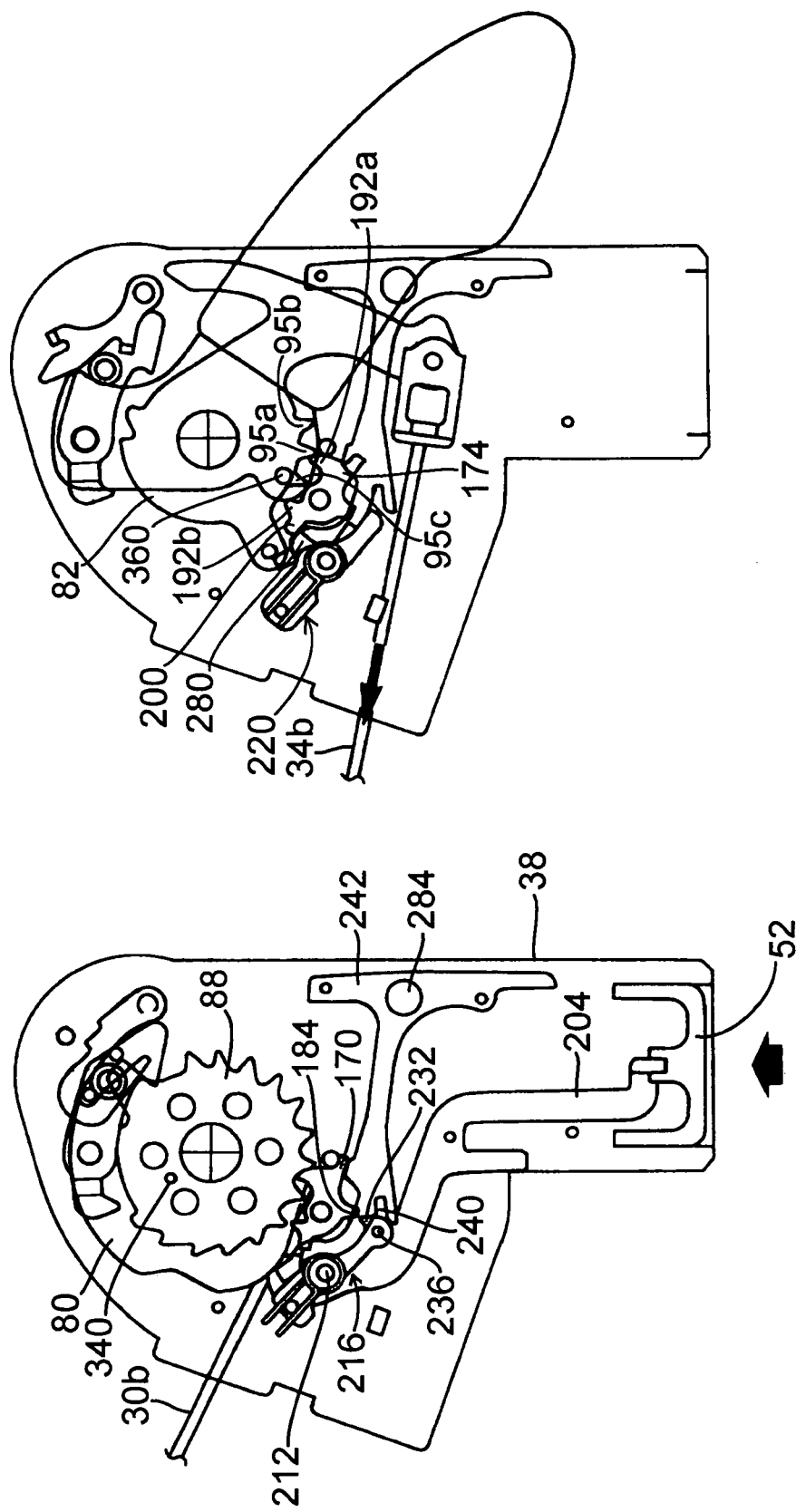

BICYCLE TRANSMISSION GEAR INDICATING DEVICE

BACKGROUND OF THE INVENTION

The present invention is directed to bicycles and, more particularly, to a bicycle control device with combined operation of multiple output elements.

Conventional bicycles have either internal or external transmissions. Internal transmissions usually include a planetary gear mechanism mounted inside the hub of the rear wheel, wherein the planetary gear mechanism changes the gear ratio of the transmission in response to movement of a lever mounted to the handlebar. External transmissions usually comprise a plurality of front sprockets mounted to the pedal crank, a front derailleur mounted to the bicycle frame, a plurality of rear sprockets mounted to the rear wheel, and a rear derailleur mounted to the bicycle frame. The front derailleur switches the drive chain among the plurality of front sprockets in response to movement of one or more front derailleur control levers mounted to the handlebar, and the rear derailleur switches the drive chain among the plurality of rear sprockets in response to movement of one or more rear derailleur control levers mounted to the handlebar.

Recently, the functions of an internal bicycle transmission and an external bicycle transmission have been combined. In such systems, a planetary gear mechanism is mounted inside the rear wheel hub, a plurality of rear sprockets are mounted to the rear wheel, and a rear derailleur is mounted to the bicycle frame. The planetary gear mechanism provides an internal transmission component (usually called an internal hub transmission), and the plurality of rear sprockets and rear derailleur provide an external transmission component. The planetary gear mechanism changes the gear ratios in the internal transmission component in response to movement of one or more internal transmission control levers mounted to the handlebar, and the rear derailleur switches the drive chain among the plurality of rear sprockets to change gear ratios in the external transmission component in response to movement of one or more external transmission control levers mounted to the handlebar.

In known bicycles that have multiple transmission components, such as front/rear derailleurs and combined internal/external transmissions, one transmission component is operated by one dedicated control device, and the other transmission component is operated by another dedicated control device. This increases the complexity of the overall bicycle transmission, and it requires the rider to remember which transmission component to operate to achieve a desired gear ratio. Sometimes it is necessary for the rider to operate both transmission components substantially simultaneously to achieve a desired gear ratio. This can make it very difficult for even an experienced cyclist to ride the bicycle effectively.

Sometimes a transmission gear indicator is provided with each transmission so that the rider knows the state of the transmission. Since a separate gear indicator is provided for each transmission, the rider must contemplate the information provided by multiple gear indicators whenever two external transmissions or combined internal/external transmissions are provided on the bicycle. This makes it very difficult to obtain a sense of the overall gear ratio provided by the multiple transmissions.

SUMMARY OF THE INVENTION

The present invention is directed to various features of a control device that may be used, for example, to control multiple bicycle transmissions. In one embodiment, a bicycle transmission gear indicating device comprises a first indicator drive member adapted to move in response to movement of a first transmission control element; a second indicator drive member adapted to move in response to movement of a second transmission control element; and an indicating unit that indicates a bicycle transmission gear. A motion communicating unit is operatively coupled to the first indicator drive member and to the second indicator drive member and is adapted to communicate motion of the first indicator drive member and the second indicator drive member to the indicating unit.

Additional inventive features will become apparent from the description below, and such features alone or in combination with the above features may form the basis of further inventions as recited in the claims and their equivalents.

BRIEF DESCRIPTION OF THE DRAWINGS

FIG. 3 is a view of the shift control device in a twelfth speed state;

FIG. 4A is a view taken along line A-A in FIG. 2 showing the shift control device in a ninth speed state;

FIG. 4B is a view taken along line B-B in FIG. 2 showing the shift control device in the ninth speed state;

FIGS. 5A and 5B are schematic diagrams used to illustrate an upshift operation of the shift control device from the ninth speed state to a tenth speed state;

FIGS. 8A-8D are schematic diagrams used to illustrate the operation of the shift control device from the tenth speed state to an eleventh speed state;

FIG. 11A is a view taken along line A-A in FIG. 2 showing the shift control device in a twelfth speed state;

FIG. 11B is a view taken along line B-B in FIG. 2 showing the shift control device in the twelfth speed state;

FIGS. 12A-12D are schematic diagrams used to illustrate the operation of the shift control device from the twelfth speed state to the tenth speed state.

DETAILED DESCRIPTION OF THE EMBODIMENTS

Figure 1:
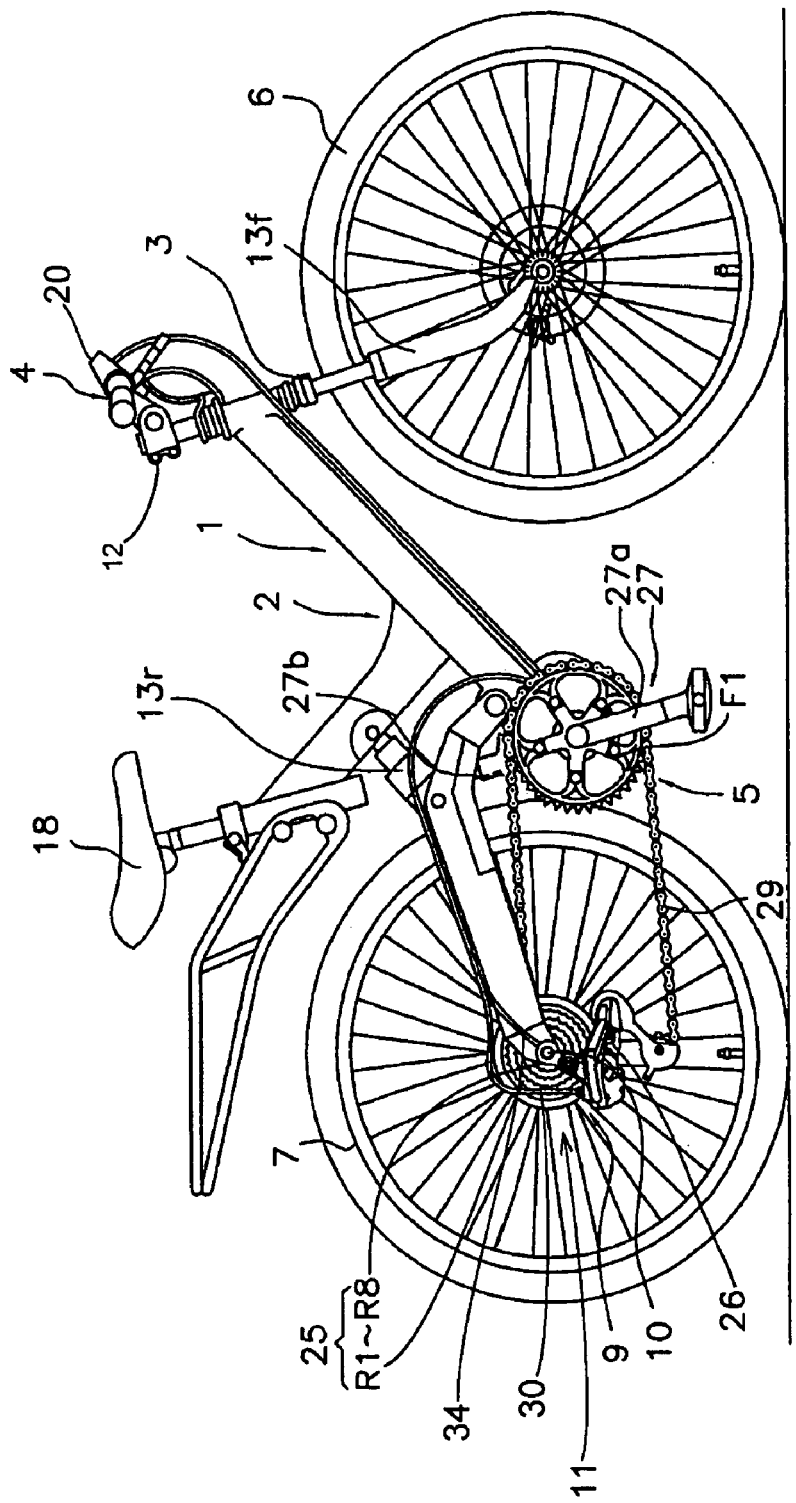
FIG. 1 is a side view of a particular embodiment of a bicycle.

FIG. 1 is a side view of a particular embodiment of a bicycle 1. Bicycle 1 comprises a frame body 2 constructed by welding together tubing having noncircular cross-sections. A front fork 3 is mounted to the front of frame body 2 for rotation around an inclined axis, and a handlebar assembly 4 is mounted to the top of front fork 3. A saddle 18 is mounted to the upper middle part of frame body 2, a drive mechanism 5 is mounted to the lower part of frame body 2, a front wheel 6 is rotatably mounted to the bottom of front fork 3, and a rear wheel 7 is rotatably mounted to the rear of frame body 2. A front suspension 13$f$ is mounted to front fork 3, and a rear suspension 13$r$ is mounted between stationary and articulated portions of frame body 2.

An eight-speed external transmission 9 is mounted to the rear of frame body 2, and a three-speed internal transmission 10 is mounted to rear wheel 7. External transmission 9 comprises, for example, a multiple sprocket assembly 25 and a derailleur 26. Multiple sprocket assembly 25 comprises eight sprockets R1-R8 mounted to rear wheel 7, and derailleur 26 is mounted at the back of frame body 2. In this embodiment, sprocket R1 is the laterally innermost sprocket, sprocket R8 is the laterally outermost sprocket, and derailleur 26 is biased toward the laterally innermost sprocket R1. Internal transmission 10 comprises a planetary gear transmission disposed within the hub of rear wheel 7. External transmission 9 and internal transmission 10 together form a combined internal/external transmission 11.

As shown in FIG. 1, drive mechanism 5 comprises a crank 27 and a chain 29. Crank 27 is rotatably mounted at the bottom bracket of frame body 2, and it comprises a right crank arm 27$a$ and a left crank arm 27$b$. A front sprocket F1 is mounted to right crank arm 27$a$. Chain 29 engages front sprocket F1 and one of the rear sprockets R1-R8 as determined by rear derailleur 26.

Figure 2:
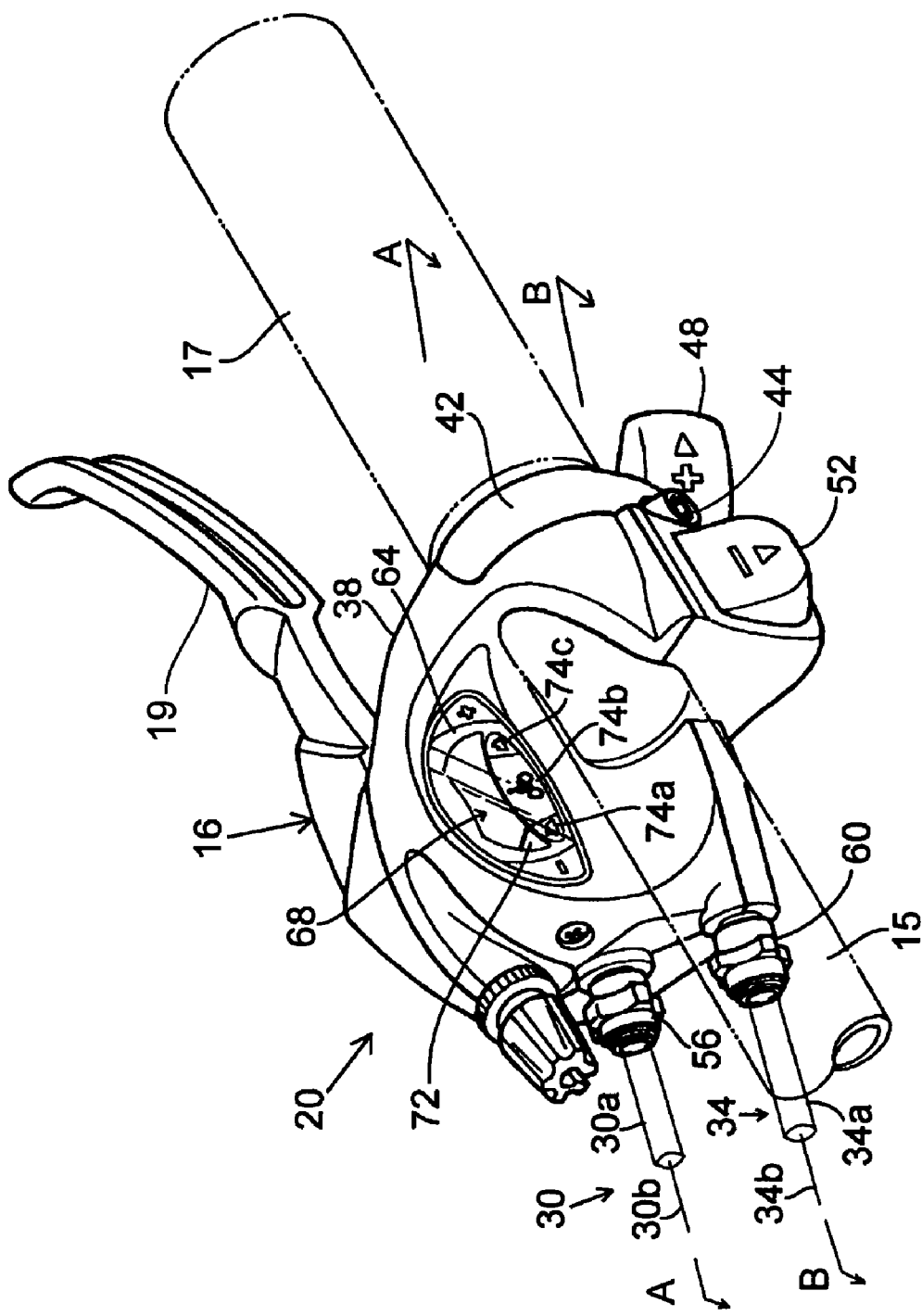
FIG. 2 is a detailed view of a shift control device mounted to the handlebar, wherein the shift control device is in a first speed position.

As shown in FIGS. 1 and 2, handlebar assembly 4 comprises a handle stem 12 mounted to the top of front fork 3 and a handlebar 15 mounted to the top of handle stem 12. Brake lever assemblies 16 and grips 17 are mounted at the opposite ends of handlebar 15. The right side brake lever assembly 16 shown in FIG. 2 includes a brake lever 19 and a shift control device 20. Brake lever 19 is structured and operates a brake cable assembly (not shown) in a conventional manner. Shift control device 20 manually operates external transmission 9 and internal transmission 10 through shift control cable assemblies 30 and 34, respectively.

As shown in FIG. 2, shift control device 20 comprises a housing 38, an attachment band 42 for attaching housing 38 to handlebar 15 using a screw 44 in a conventional manner, an input element in the form of an upshift lever 48 for upshifting transmission 11, another input element in the form of a downshift lever 52 for downshifting transmission 11, a cable adjusting barrel 56 for terminating an outer casing 30$a$ of shift control cable assembly 30 while allowing an inner cable 30$b$ to pass into housing 38, a cable adjusting barrel 60 for terminating an outer casing 34$a$ of shift control cable assembly 34 while allowing an inner cable 34$b$ to pass into housing 38, and an indicator window 64 for viewing a transmission gear indicator 68.

Transmission gear indicator 68 functions similar to a bar graph, wherein the length of a shaded indicator portion 72 indicates the overall gear ratio (speed state) of transmission 11. FIG. 2 shows transmission gear indicator 68 indicating a first speed state. When the shaded indicator portion 72 extends in close proximity to a first icon 74$a$ representing a cyclist ascending a hill (as in FIG. 2), then drive mechanism 5 produces fewer revolutions of rear wheel 7 for each revolution of crank 27, thus facilitating uphill riding. When the shaded indicator portion 72 extends in close proximity to a second icon 74$b$ representing a cyclist riding on a flat terrain, then drive mechanism 5 produces a moderate number of revolutions of rear wheel 7 for each revolution of crank 27. When the shaded indicator portion 72 extends in close proximity to a third icon 74$c$ representing a cyclist descending a hill (as in FIG. 3 which indicates a twelfth speed state in this embodiment), then drive mechanism 5 produces many revolutions of rear wheel 7 for each revolution of crank 27, thus facilitating high speed riding. In any event, transmission gear indicator 68 is a single unit that provides information related to the overall state of multiple bicycle transmission, thus making it easier for the rider.

In general, pressing upshift lever 48 causes shift control device 20 to move inner cable 30$b$ and/or inner cable 34$b$ to put transmission 11 in progressively larger gear ratios, and pressing downshift lever 52 causes shift control device 20 to move inner cable 30$b$ and/or inner cable 34$b$ to put transmission 11 in progressively smaller gear ratios. For example, in this embodiment, pressing upshift level 48 causes external transmission 9 and internal transmission 10 to assume the positions shown in Table 1:

TABLE 1

| Speed State | External transmission | Internal Transmission |
|---|---|---|
| 1 | 1 | 1 |
| 2 | 2 | 1 |
| 3 | 1 | 2 |
| 4 | 2 | 2 |
| 5 | 3 | 2 |
| 6 | 4 | 2 |
| 7 | 5 | 2 |
| 8 | 6 | 2 |
| 9 | 7 | 2 |
| 10 | 8 | 2 |
| 11 | 7 | 3 |
| 12 | 8 | 3 |

Conversely, pressing downshift lever 52 causes external transmission 9 and internal transmission 10 to assume the positions shown in Table 2:

TABLE 2

| Speed State | External transmission | Internal Transmission |
|---|---|---|
| 12 | 8 | 3 |
| 10 | 8 | 2 |
| 9 | 7 | 2 |
| 8 | 6 | 2 |
| 7 | 5 | 2 |
| 6 | 4 | 2 |
| 5 | 3 | 2 |
| 4 | 2 | 2 |
| 3 | 1 | 2 |
| 1 | 1 | 1 |

FIG. 4A is a view taken along line A-A in FIG. 2 showing shift control device 20 in a ninth speed state (external transmission=7; internal transmission=2, or (7,2)), FIG. 4B is a view taken along line B-B in FIG. 2 showing shift control device 20 in the ninth speed state, and FIGS. 5A-5B are schematic diagrams that may be used to illustrate the operation of shift control device 20 from the ninth speed state (7,2) to the tenth speed state (8,2). As shown in those figures, inner cable 30b is connected to an output element in the form of a transmission control element in the form of an external transmission cable winding member 80 through a conventional cable end bead (not shown), and inner cable 34b is connected to an output element in the form of a transmission control element in the form of an internal transmission cable pulling member 82 through a wire connector 83. External transmission cable winding member 80 has a pair of control pins 84a and 84b (FIGS. 5A and 10A) extending from an upper surface thereof. A positioning member in the form of an external transmission ratchet 88 with control teeth 92 is attached to external transmission cable winding member 80 so that both external transmission cable winding member 80 and external transmission ratchet 88 rotate integrally around a pivot shaft 93 that defines a common pivot axis X. Pivot shaft 93 also supports upshift lever 48 and internal transmission cable pulling member 82 for rotation around axis X. As best seen in FIG. 5B, internal transmission cable pulling member 82 comprises a plurality of drive teeth 94a and 94b, a plurality of positioning teeth 95, a switch control arm 96 defining a control recess 97, a control arm 98 with a control pin 99 extending from an upper surface thereof, and an actuating arm 101 connected to wire connector 83.

A spring 102 (FIG. 4B) is connected between upshift control lever 48 and housing 38 for biasing upshift control lever 48 clockwise to the rest position shown in FIG. 2. A drive member in the form of a drive pawl 100 is pivotably coupled to upshift lever 48 through a pivot shaft 104. Drive pawl 100 is biased in a counterclockwise direction by a pawl spring (not shown), and it is used to rotate external transmission cable winding member 80 and internal transmission cable pulling member 82 independently of each other in response to counterclockwise rotation of upshift lever 48. For that purpose, drive pawl 100 includes a main body 108, an external transmission drive tooth 112 extending from a front portion of main body 108 through a stepped portion 116, an internal transmission drive tooth 120 extending from a rear portion of main body 108, and a pawl control pin 124 extending from an upper surface of main body 108 to the right of pivot shaft 104. Stepped portion 116 causes external transmission drive tooth 112 to be offset from internal transmission drive tooth 120 in the direction of axis X so that external transmission drive tooth 112 aligns with control teeth 92 of external transmission ratchet 88, and external transmission drive tooth 120 aligns with drive teeth 94a and 94b of internal transmission cable pulling member 82.

A switching element 130 (FIGS. 4B and 5B), a first switching element control member 131 (FIGS. 4A and 5A) and a second switching element control member 132 (FIG. 4A) are pivotably supported by a pivot shaft 134. Switching element 130 is biased in a counterclockwise direction by a spring (not shown), first switching element control member 131 is biased in a clockwise direction by another spring (not shown), and second switching element control member 132 is biased in a counterclockwise direction by another spring (not shown). Switching element 130 includes a pawl control surface 138 and a control projection 142. Pawl control surface 138 cooperates with pawl control pin 124 in a manner discussed below. First switching element control member 131 is a U-shaped member defining a control recess 146 and a support surface 150. Control recess 146 receives control pins 84a and 84b extending from external transmission cable winding member 80 in a manner discussed below, and support surface 150 supports control projection 142 of switching element 130. Second switching element control member 132 includes a cam follower 160, a control pin 164 and a control tail 166. Cam follower 160 abuts against a cam surface 168 formed by the outer peripheral surface of external transmission cable winding member 80 to maintain cam follower 160 in a radially outward position except for a situation discussed below. Control pin 164 abuts against support surface 150 of first switching element control member 131, and control tail 166 selectively engages control recess 97 of control arm 96 of internal transmission cable pulling member 82.

As shown more clearly in FIGS. 5A and 5B, external transmission positioning pawl 170 pivotably supported by a pivot shaft 172 is used to position external transmission cable winding member 80, and an internal transmission positioning pawl 174 pivotably supported by a pivot shaft 176 is used to position internal transmission cable pulling member 82. External transmission positioning pawl 170 comprises pawl teeth 180a and 180b for engaging control teeth 92, a first control tab 184, and a second control tab 188. Internal transmission positioning pawl 174 comprises pawl teeth 192a and 192b for engaging positioning teeth 95, a first control tab 196 and a second control tab 200.

Figure 7A:
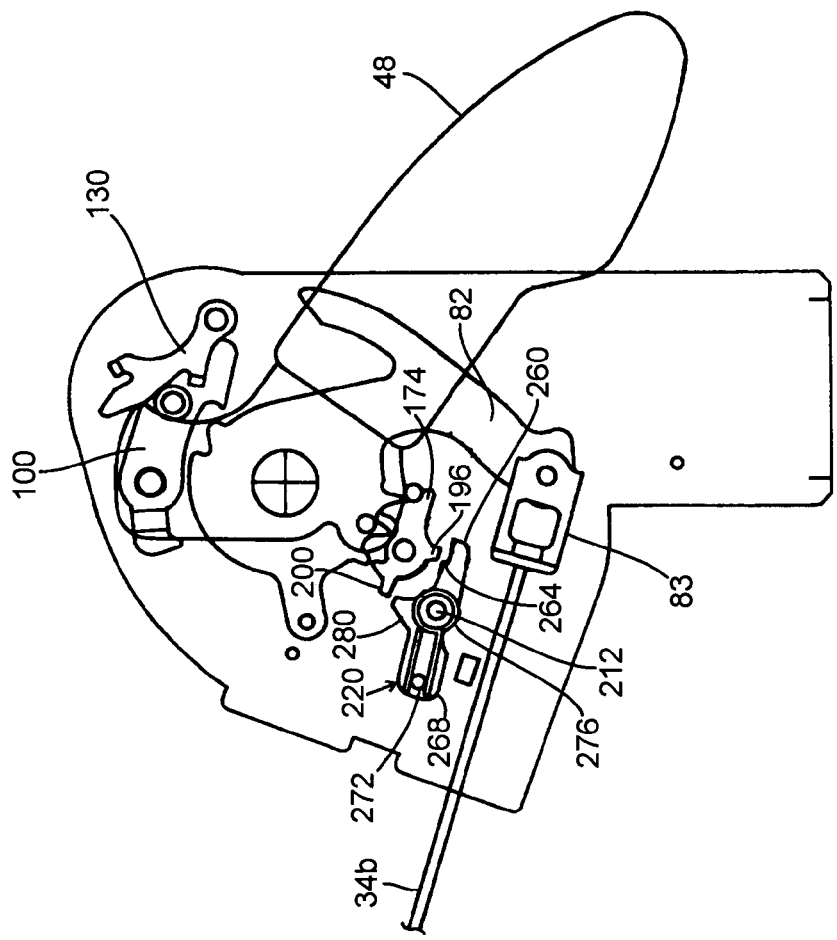
FIGS. 7A-7D are schematic diagrams used to illustrate a downshift operation of the shift control device from the tenth speed state back to the ninth speed state.
Figure 7B:
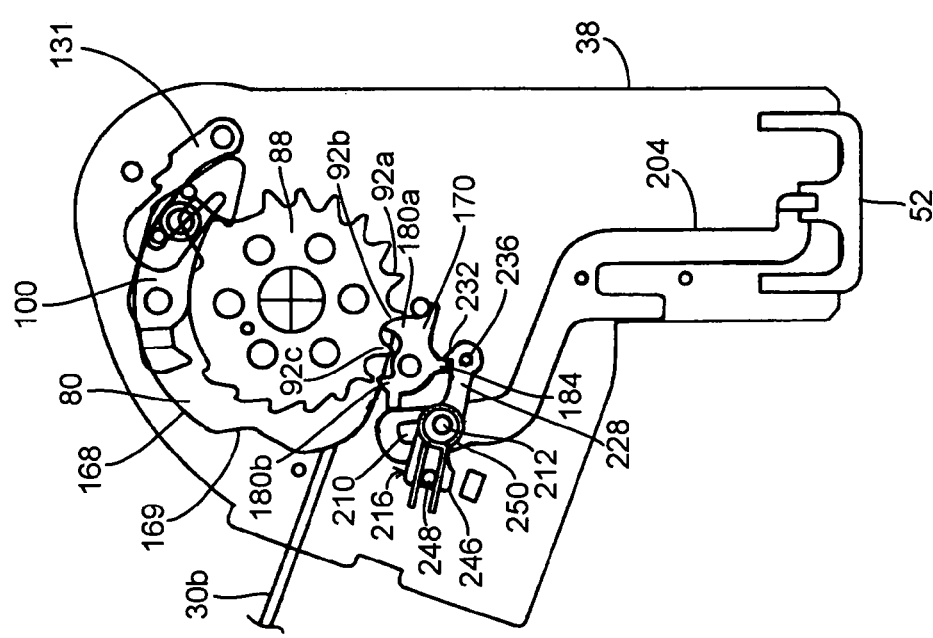

The upper end of downshift lever 52 is pivotably coupled to housing 38 by a pivot shaft (not shown). As shown in FIG. 4A, downshift lever 52 is coupled to a downshift control lever 204 so that downshift control lever 204 translates upwardly (when viewed in FIG. 4A) whenever downshift lever 52 is pressed. A spring 208 is connected between downshift control lever 204 and housing 38 for biasing downshift control lever 204 downwardly in FIG. 4A, thus pivoting the lower portion of downshift lever 52 outwardly to the position shown in FIG. 2. Downshift control lever 204 includes a control slot 210 for slidably and rotatably receiving a support axle 212. Support axle 212 supports an external transmission pawl control member 216 and an internal transmission pawl control member 220. As best shown in FIGS. 7A and 7B, a first end 228 of external transmission pawl control member 216 comprises a pawl drive hook 232 and a control pin 236, wherein control pin 236 engages a slot 240 (FIG. 4A) in a pawl control switching member 242. A second end 246 of external transmission pawl control member 216 comprises a spring pin 248 that is disposed between ends of a spring 250 that is coiled around support shaft 212 and biases external transmission pawl control member 216 counterclockwise. A first end 260 of internal transmission pawl control member 220 comprises a control abutment 264, and a second end 268 of internal transmission pawl control member 220 comprises a spring pin 272 that is disposed between ends of a spring 276 that is coiled around support shaft 212 and biases internal transmission pawl control member 220 counterclockwise. A control abutment 280 is formed at an intermediate portion of internal transmission pawl control member 220.

As shown in FIG. 4A, pawl control switching member 242 is pivotably coupled to housing 38 through a pivot shaft 284. In addition to slot 240 mentioned above, pawl control switching member 242 includes a control arm 286 that defines a switch control abutment 288.

The operation of shift control device 20 will be explained beginning with an upshift from the ninth speed state (7,2) shown in FIGS. 4A, 4B, 5A and 5B to the tenth speed state (8,2) shown in FIGS. 6A and 6B. The schematic diagrams shown in FIGS. 5A and 5B are best used for this description. In the rest position of upshift lever 48, external transmission drive tooth 112 of drive pawl 100 is maintained out of contact with external transmission ratchet 88 by a ledge of conventional construction (not shown). When upshift lever 48 is rotated counterclockwise, drive pawl 100 pivots counterclockwise, and external transmission drive tooth 112 presses against a control tooth 92a of external transmission ratchet 88. Since drive pawl 100 pivoted counterclockwise, internal transmission drive tooth 120 does not engage any of the drive teeth 94a or 94b on internal transmission cable pulling member 82, so internal transmission cable pulling member 82 remains stationary. External transmission drive tooth 112 causes external transmission ratchet 88 to rotate external transmission cable winding member 80 counterclockwise, thus winding inner cable 30b and moving derailleur 26 to sprocket R8. During this time, external transmission positioning pawl 170 rotates clockwise as a result of pressure from a control tooth 92b to allow pawl tooth 180a to ride over control tooth 92b and into the space between control teeth 92b and 92c. Pawl tooth 180a then abuts against control tooth 92b to maintain external transmission ratchet 88, and hence external transmission cable winding member 80, in the proper position after upshift lever 48 is released. The final state of shift control unit 20 is shown in FIGS. 6A and 6B.

Figure 6A:
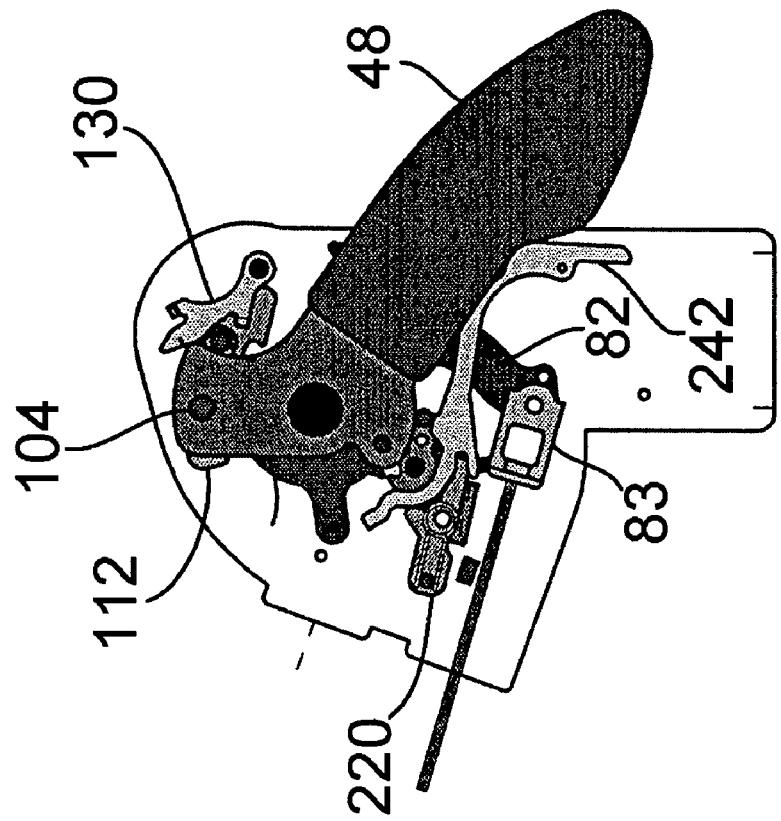
FIG. 6A is a view taken along line A-A in FIG. 2 showing the shift control device in the tenth speed state.
Figure 6B:
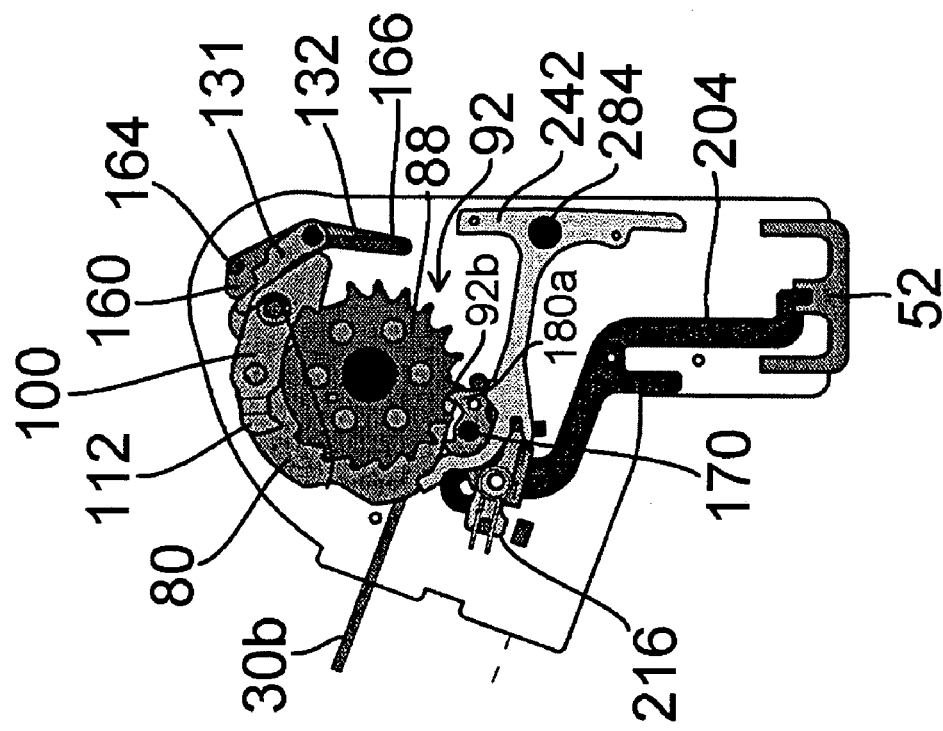
FIG. 6B is a view taken along line B-B in FIG. 2 showing the shift control device in the tenth speed state.
Figure 7D:
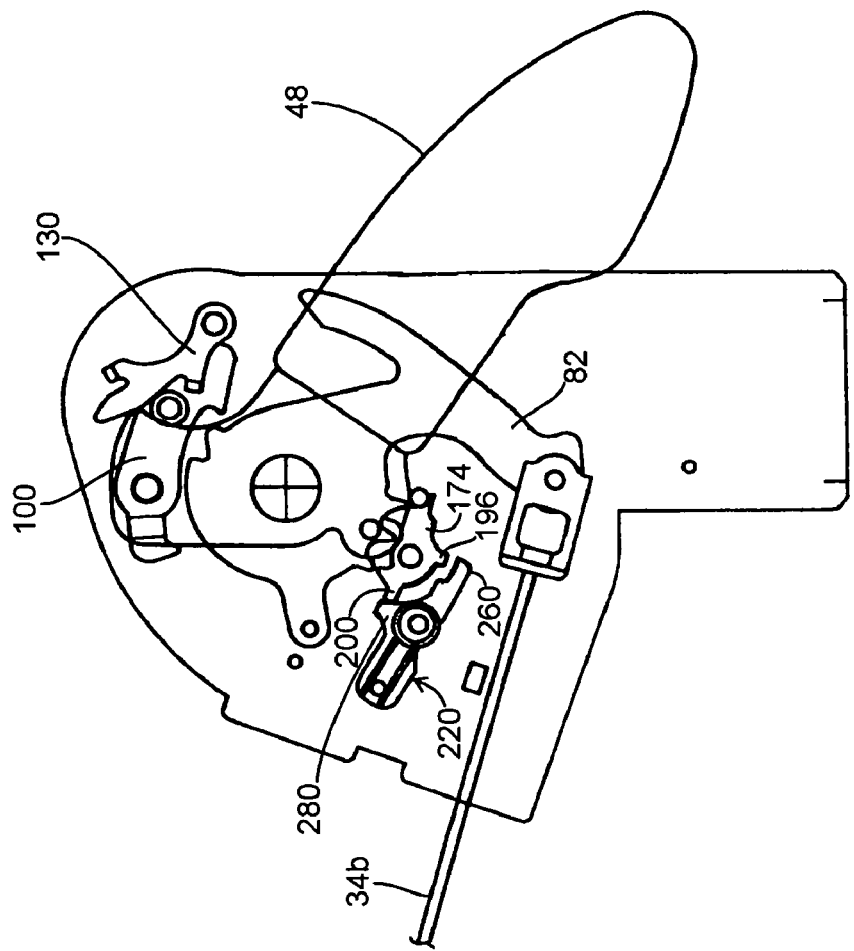
Figure 7C:
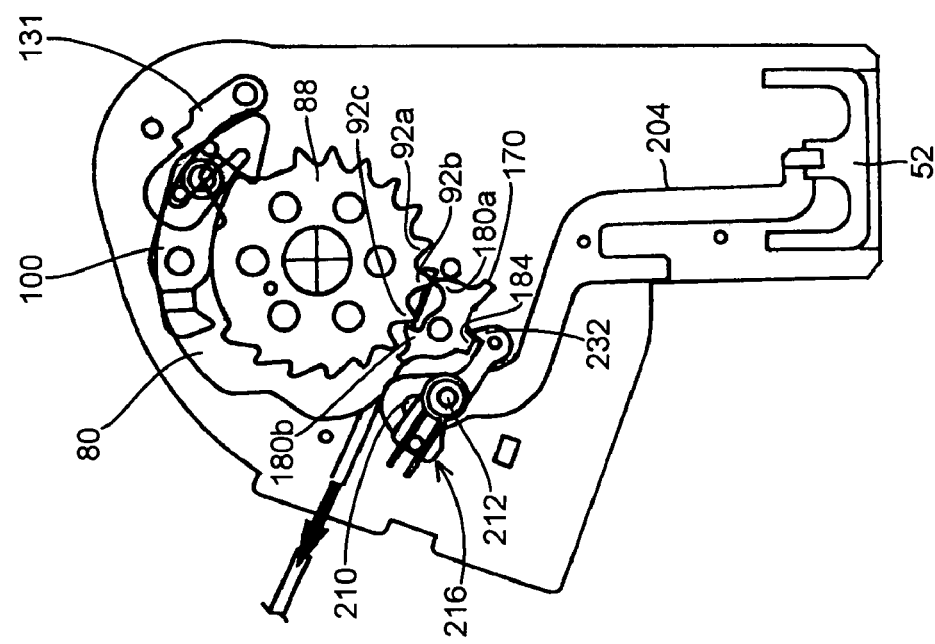

FIGS. 7A-7D are schematic diagrams illustrating the operation of shift control device 20 when downshifting from the tenth speed state (8,2) shown in FIGS. 6A and 6B, back to the ninth speed state (7,2) shown in FIGS. 4A and 4B in response to pressing downshift lever 52. FIGS. 7A and 7B show shift control device 20 when upshift lever 48 and downshift lever 52 are in their respective rest positions, and FIGS. 7C and 7D show shift control device 20 when downshift lever 52 is being pressed while upshift lever 48 remains in its rest position. As shown in FIG. 7A and 7C, pressing downshift lever 52 causes downshift control lever 204 to move upwardly, thus causing support axle 212 to slide within control slot 210 and also move upwardly. External pawl control member 216 and internal pawl control member 220 also move upwardly, since they move together with support axle 212. As a result, pawl drive hook 232 of external pawl control member 216 pulls against first control tab 184 of external positioning pawl 170, thus rotating external positioning pawl 170 clockwise from the position shown in FIG. 7A to the position shown in FIG. 7C. Pawl tooth 180a disengages from control tooth 92b of external transmission ratchet 88, thus allowing external transmission cable winding member 80 and external transmission positioning ratchet 88 to rotate clockwise. Pawl tooth 180b then abuts against control tooth 92c to prevent further rotation of external transmission cable winding member 80 and external transmission positioning ratchet 88 until downshift lever 52 is released. Thereafter, pawl tooth 180a abuts against control tooth 92a in the same manner shown in FIGS. 4A and 5A. During this time, internal transmission pawl control member 220 has no effect on internal transmission positioning pawl 174, since, as shown in FIG. 7D, the first end 260 of internal transmission pawl control member 220 does not have a corresponding hook to engage first control tab 196 on internal transmission positioning pawl 174, and control abutment 280 on internal transmission positioning pawl 220 does not contact second control tab 200 on internal transmission positioning pawl 174. Accordingly, internal transmission cable pulling member 82 remains stationary.

Figure 9A:
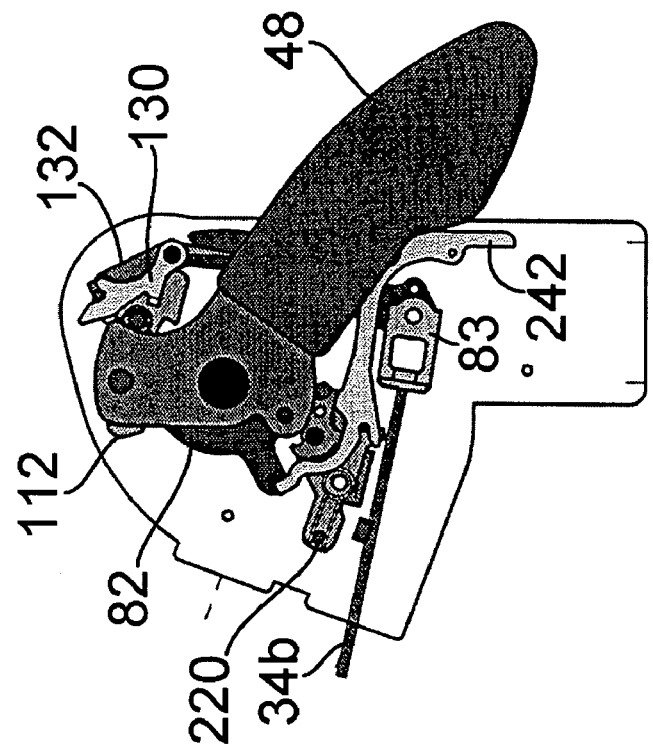
FIG. 9A is a view taken along line A-A in FIG. 2 showing the shift control device in the eleventh speed state.
Figure 9B:
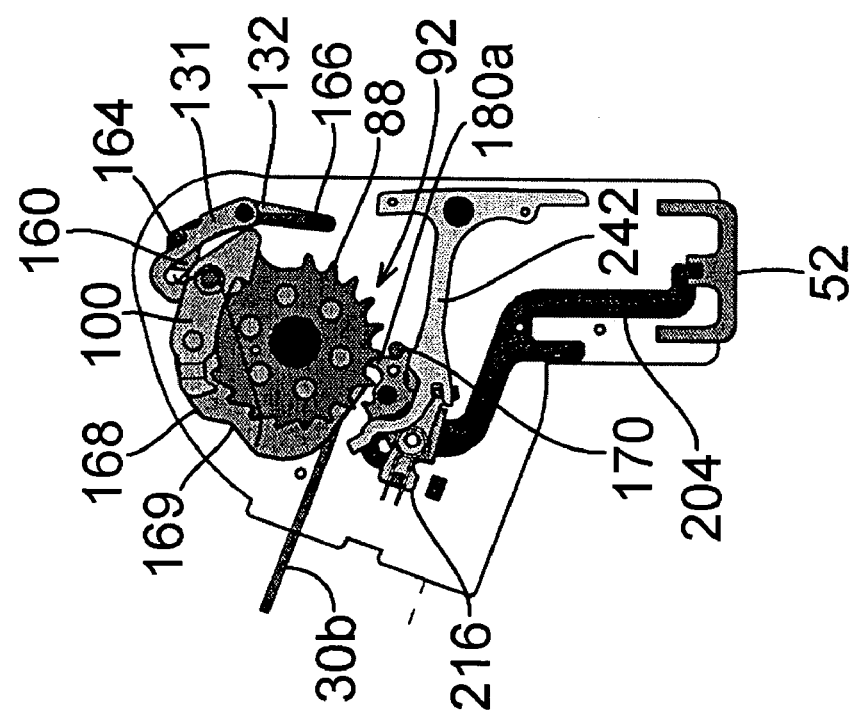
FIG. 9B is a view taken along line B-B in FIG. 2 showing the shift control device in the eleventh speed state.

FIGS. 8A-8D are schematic diagrams illustrating the operation of shift control device 20 when upshifting from the tenth speed state (8,2) shown in FIGS. 6A and 6B, to the eleventh speed state (7,3) shown in FIGS. 9A and 9B in response to pressing upshift lever 48. When shift control device 20 is in the tenth speed state, control pins 84a and 84b on external transmission cable winding member 80 engage control recess 146 in first switching element control member 131, thus rotating first switching element control member 131 counterclockwise around pivot shaft 134 to the position shown in FIG. 8A. This, in turn, allows switching element 130 to rotate counterclockwise around pivot shaft 134 as shown in FIG. 8B so that pawl control surface 138 presses against pawl control pin 124 on drive pawl 100, thus rotating drive pawl 100 clockwise. As a result, when upshift lever 48 rotates counterclockwise, internal transmission drive tooth 120 on drive pawl 100 engages drive tooth 94b on internal transmission cable pulling member 82, thus rotating internal transmission cable pulling member 82 counterclockwise as shown in FIG. 8D so that actuating arm 101 pulls inner cable 34b to set internal transmission 10 to the high speed state. During this time, internal transmission positioning pawl 174 rotates clockwise as a result of pressure from a positioning tooth 95a to allow pawl tooth 192a to ride over positioning tooth 95a. Pawl tooth 192a then abuts against positioning tooth 92a and maintains internal transmission cable pulling member 82 in the proper position after upshift lever 48 is released.

When internal transmission positioning pawl 174 rotates clockwise as described above, first control tab 196 on internal transmission positioning pawl 174 presses against control abutment 264 on internal transmission pawl control member 220, thus causing support axle 212 to slide upwardly within control slot 210 in downshift control lever 204. This, in turn, causes pawl drive hook 232 on external transmission pawl control member 216 to pull against first control tab 184 of external positioning pawl 170, thus rotating external positioning pawl 170 clockwise from the position shown in FIG. 8A to the position shown in FIG. 8C. Pawl tooth 180a disengages from the control tooth 92 of external transmission ratchet 88 with which it was previously engaged, thus allowing external transmission cable winding member 80 and external transmission positioning ratchet 88 to rotate clockwise in the same manner as described above when downshifting shift control device 20 from the tenth speed state to the ninth speed state. As a result, not only has internal transmission 10 upshifted by one gear, but external transmission 9 has downshifted by one gear. The final state of shift control unit 20 is shown in FIGS. 9A and 9B.

Figure 10A:
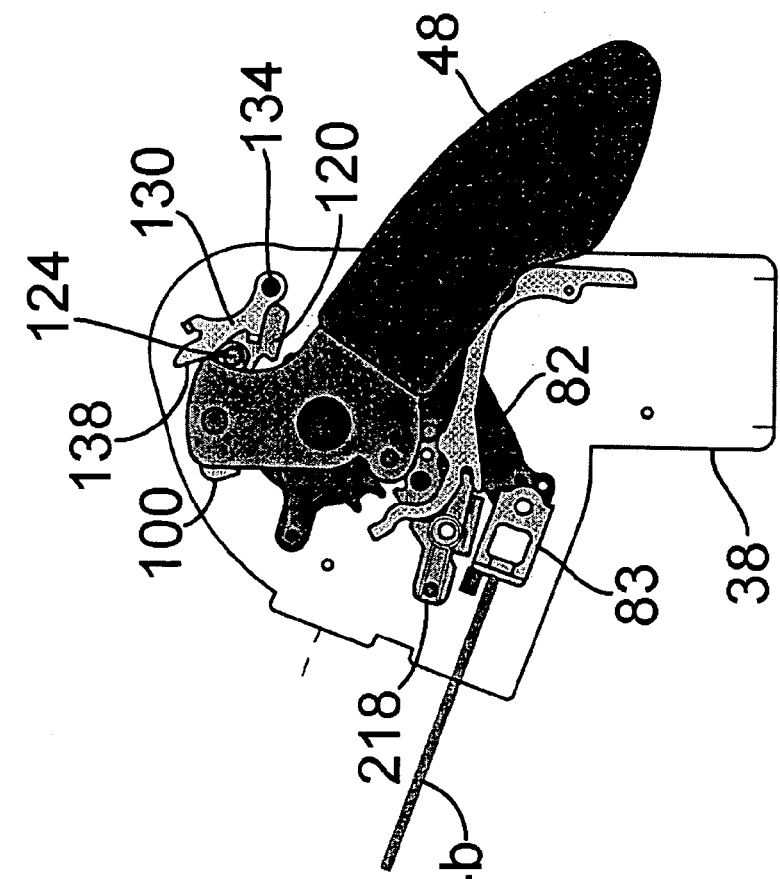
FIG. 10A is a view taken along line A-A in FIG. 2 showing the shift control device in a second speed state.
Figure 10B:
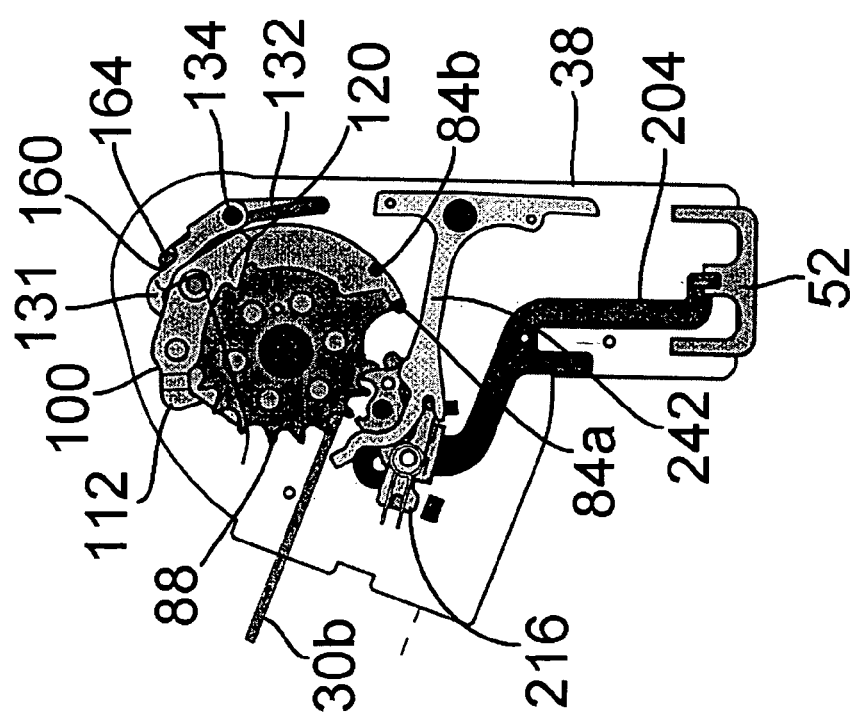
FIG. 10B is a view taken along line B-B in FIG. 2 showing the shift control device in the second speed state.

It should be noted that the same phenomenon occurs when shifting from the second speed state (2,1) to the third speed state (1,2). FIGS. 10A and 10B show shift control device 20 in the second speed state. In this case, cam follower 160 of second switching element control member 132 is disposed in switching recess 169 (FIG. 9A) formed on cam surface 168. As a result, control pin 164 presses first switching element control member 131 counterclockwise which, in turn allows switching element 130 to rotate counterclockwise around pivot shaft 134 so that pawl control surface 138 presses against pawl control pin 124 on drive pawl 100, thus rotating drive pawl 100 clockwise. As a result, when upshift lever 48 rotates counterclockwise, internal transmission drive tooth 120 on drive pawl 100 engages drive tooth 94a on internal transmission cable pulling member 82, thus rotating internal transmission cable pulling member 82 counterclockwise so that actuating arm 101 pulls inner cable 34b to set internal transmission 10 to the middle speed state. At the same time, external transmission positioning pawl 170, internal transmission positioning pawl 174, external pawl control member 216 and internal pawl control member 220 cooperate in the same maimer described above to rotate external transmission cable winding member 80 clockwise by one gear position to produce the final third speed state (1,2). After internal transmission cable pulling member 82 rotates out of the low speed position, control tail 166 of second switching element control member 132 is disposed in control recess 97 and abuts against switch control arm 96 of internal transmission cable pulling member 82, thus disabling second switching element control member 132 from operating as long as internal transmission cable pulling member 82 is in the middle or high speed states.

When shift control device 20 is in the eleventh speed state shown in FIGS. 9A and 9B, rotating upshift lever 48 again causes shift control device to move to the twelfth speed state shown in FIGS. 11A and 11B. In this case, external transmission cable winding member 80 rotates counterclockwise to pull inner cable 30b so that derailleur 26 switches chain 29 from sprocket R7 to sprocket R8. The operation is the same as that described above when discussing shifting from the ninth speed state to the tenth speed state.

Figure 12A:
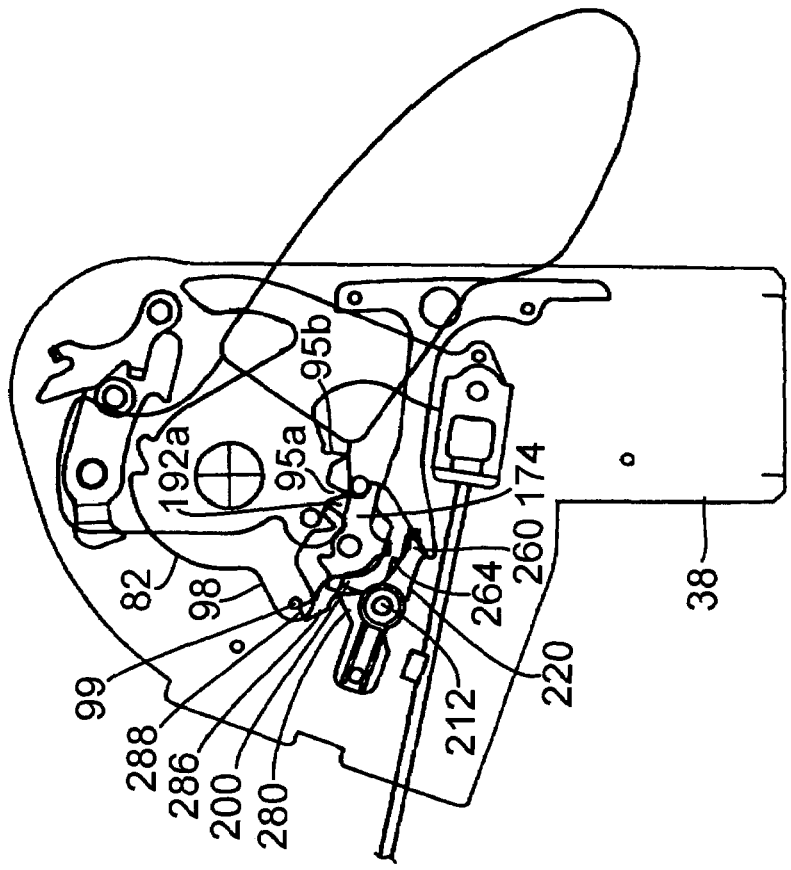
Figure 12B:
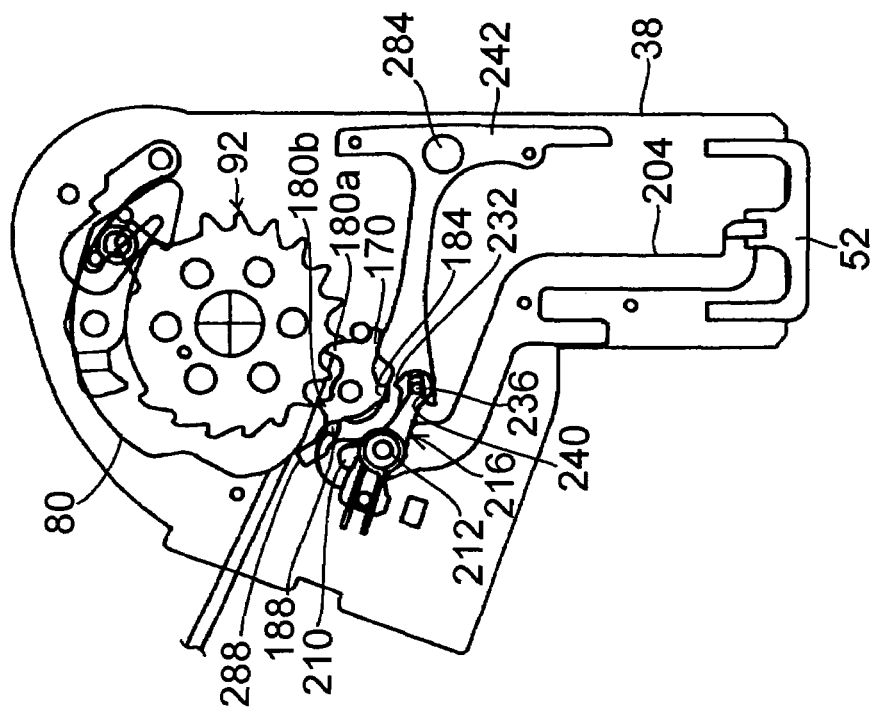

FIGS. 12A-12D are schematic diagrams illustrating the operation of shift control device 20 when downshifting from the twelfth speed state (8,3) shown in FIGS. 11A and 11B, back to the tenth speed state (8,2) shown in FIGS. 6A and 6B in response to pressing downshift lever 52. As best shown in FIG. 11B, in the twelfth speed state control pin 99 on control arm 98 of internal transmission cable pulling member 82 presses against switch control abutment 288 of control arm 286 of pawl control switching member 242 and rotates pawl control switching member 242 counterclockwise around pivot shaft 284. Since control pin 236 of external transmission pawl control member 216 engages slot 240 in pawl control switching member 242, external transmission pawl control member 216 and internal transmission pawl control member 220 both rotate clockwise as a result of the counterclockwise rotation of pawl control switching member 242. Thus, when downshift lever 52 is pressed and downshift control lever 204 and support axle 212 move upwardly as shown in FIG. 12C, pawl drive hook 232 on external transmission pawl control member 216 does not engage first control tab 184 on external transmission positioning pawl 170. Thus, external transmission positioning pawl 170 does not rotate, and likewise external transmission ratchet 88 and external transmission cable winding member 80 do not rotate. On the other hand, control abutment 280 on internal transmission pawl control member 220 presses against second control tab 200 on internal transmission positioning pawl 174 as shown in FIG. 12D and rotates internal transmission positioning pawl 174 clockwise. Pawl tooth 192a disengages from positioning tooth 95a on internal transmission cable pulling member 82, thus allowing internal transmission cable pulling member 8 to rotate clockwise. Pawl tooth 192b then abuts against positioning tooth 95c to prevent further rotation of external transmission cable pulling member 82 until downshift lever 52 is released. Thereafter, pawl tooth 192a abuts against positioning tooth 95b as shown in FIG. 5B.

It should be noted that the same phenomenon occurs when downshifting from the third speed state (1,2) to the first speed state (1,1). In this case (not shown in the drawings), control pin 82a extending from external transmission cable winding member 80 presses downwardly against pawl control switching member 242, thus rotating pawl control switching member 242 counterclockwise, and shift control device 20 operates as described above.

Figure 13:
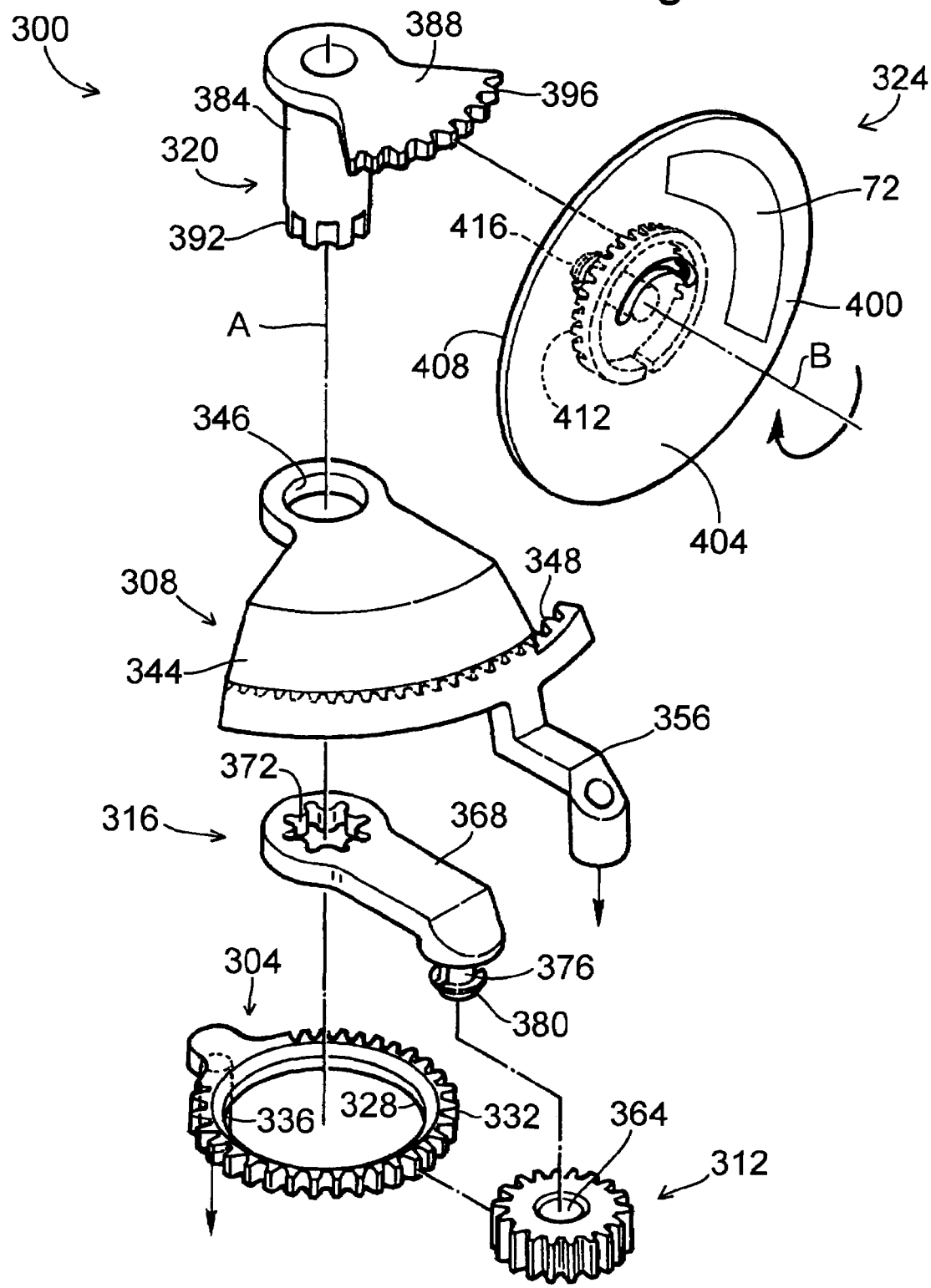
FIG. 13 is an exploded view of the gear indicator assembly.

FIG. 13 is an exploded view of a transmission gear indicator assembly 300. Transmission gear indicator assembly 300 comprises an indicator drive member in the form of a sun gear member 304, another indicator drive member in the form of a ring gear member 308, an intermediate member in the form of a planet gear 312, a motion communicating member 316, a motion communicating member 320, and a transmission gear indicating unit 324. Sun gear member 304 comprises an annular sun gear body 328, an external sun gear tooth portion 332 and an external transmission coupling pin 336 that engages a coupling opening 340 (FIG. 12C) in external transmission ratchet 88 so that sun gear member 304, external transmission ratchet 88 and external transmission cable winding member 80 rotate as a unit. Ring gear member 308 comprises a fan-shaped ring gear body 344 with a centrally disposed opening 346, an internal ring gear tooth portion 348, and an internal transmission coupling pin 356 that engages a coupling opening 360 (FIG. 12D) in internal transmission cable pulling member 82 so that ring gear member 308 and internal transmission cable pulling member 82 rotate as a unit. Planet gear 312 includes a coupling opening 364, and it is disposed between sun gear member 304 and ring gear member 308 so as to mesh with sun gear tooth portion 332 and ring gear tooth portion 348, respectively.

Motion communicating member 316 comprises a motion transferring member in the form of a motion communicating arm 368 having an internal splined opening 372 on one end and a bifurcated planet gear coupling pin 376 on an opposite end. Planet gear coupling pin 376 engages coupling opening 364 in planet gear 312. A split frusto-conical retainer 380 is disposed on an end of planet gear coupling pin 376 and is disposed on the bottom side of planet gear 312 when planet gear coupling pin 376 is disposed in coupling opening 364 so that planet gear 312 is retained to motion communicating arm 368.

Motion communicating member 320 comprises a motion communicating shaft 384 and a fan-shaped motion direction changing member 388. Motion communicating shaft 384 includes an external splined end 392 that engages the internal splined opening 372 in motion communicating arm 368 so that motion communicating arm 368 and motion communicating shaft 384 rotate as a unit around an axis A. An external fan gear portion 396 is disposed on the outer radial surface of motion direction changing member 388.

Transmission gear indicating unit 324 comprises a disk-shaped indicator body 400 having a front face 404 and a rear face 408, wherein the shaded indicator portion 72 is disposed on front face 404. A rotation converting unit in the form of a motion direction changing ring gear 412 and a housing coupling pin 416 is disposed on rear face 408. Motion direction changing ring gear 412 engages the fan gear portion 396 of motion communicating member 320 so that indicator body 400 rotates around an axis B that is substantially perpendicular to axis A in response to rotation of motion communicating member 320. Housing coupling pin 416 rotatably couples transmission gear indicating unit 324 to housing 38 so that shaded indicator portion 72 is visible through indicator window 64 as shown in FIGS. 2 and 3.

While the above is a description of various embodiments of inventive features, further modifications may be employed without departing from the spirit and scope of the present invention. For example, the size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle transmission gear indicating device comprising:
   a first indicator drive member caused to move in response to movement of a first transmission control element that moves to change gear ratios in the bicycle transmission;
   a second indicator drive member adapted to move in response to movement of a second transmission control element that moves to change gear ratios in the bicycle transmission;
   an indicating unit that indicates a bicycle transmission gear; and
   a motion communicating unit operatively coupled to the first indicator drive member and to the second indicator drive member and adapted to communicate motion of the first indicator drive member and the second indicator drive member to the indicating unit.

2. The device according to claim 1 wherein the first indicator drive member rotates in response to movement of the first transmission control element, and wherein the second indicator drive member rotates in response to movement of the second transmission control element.

3. The device according to claim 2 wherein the first indicator drive member and the second indicator drive member rotate around a common axis.

4. The device according to claim 1 wherein the motion communicating unit comprises an intermediate member that receives motion from the first indicator drive member and the second indicator drive member so as to move in response to movement of either the first indicator drive member or the second indicator drive member, wherein movement of the intermediate member is communicated to the indicating unit.

5. The device according to claim 4 wherein the motion communicating unit further comprises a motion transferring member coupled to the intermediate member for communicating movement of the intermediate member to the indicating unit at a location offset from the intermediate member.

6. The device according to claim 5 wherein the intermediate member rotates the motion transferring member around a rotational axis.

7. The device according to claim 6 wherein the motion transferring member communicates movement of the intermediate member to the indicating unit at the rotational axis.

8. The device according to claim 4 wherein the first indicator drive member comprises a first indicator drive gear, wherein the second indicator drive member comprises a second indicator drive gear, and wherein the intermediate member comprises an intermediate gear.

9. The device according to claim 8 wherein the first indicator drive gear comprises a sun gear member, wherein the second indicator drive gear comprises a ring gear member, and wherein the intermediate gear is disposed between the sun gear member and the ring gear member.

10. The device according to claim 9 wherein the motion communicating unit further comprises a motion transferring member coupled to the intermediate gear for communicating movement of the intermediate gear to the indicating unit at a location offset from the intermediate gear.

11. The device according to claim 10 wherein the intermediate gear rotates the motion transferring member around a rotational axis.

12. The device according to claim 11 wherein the motion transferring member communicates movement of the intermediate gear to the indicating unit at the rotational axis.

13. The device according to claim 12 wherein the indicating unit comprises a rotating indicator that rotates in response to rotation of the motion transferring member.

14. The device according to claim 13 wherein the indicating unit comprises a rotation converting unit that converts rotation of the motion transferring member around the rotational axis to rotation of the rotating indicator around an indicating axis that is different from the rotational axis.

15. The device according to claim 14 wherein the rotational axis is substantially perpendicular to the indicator axis.

16. The device according to claim 10 wherein the first indicator drive gear rotates in response to movement of the first transmission control element, and wherein the second indicator drive gear rotates in response to movement of the second transmission control element.

17. The device according to claim 16 wherein the first indicator drive gear and the second indicator drive gear rotate around a common axis.

18. The device according to claim 17 wherein the intermediate gear rotates the motion transferring member around a rotational axis.

19. The device according to claim 18 wherein the motion transferring member communicates movement of the intermediate gear to the indicating unit at the rotational axis.

20. The device according to claim 19 wherein the rotational axis is coaxial with the common axis.

21. The device according to claim 20 wherein the intermediate gear engages the first indicator drive gear and the second indicator drive gear.

22. The device according to claim 19 wherein the indicating unit comprises a rotating indicator that rotates in response to rotation of the motion transferring member.

23. The device according to claim 22 wherein the indicating unit comprises a rotation converting unit that converts rotation of the motion transferring member around the rotational axis to rotation around an indicating axis that is different from the rotational axis.

24. The device according to claim 23 wherein the rotational axis is substantially perpendicular to the indicator axis.

* * * * *